(12) United States Patent
Chuang

(10) Patent No.: US 10,341,137 B2
(45) Date of Patent: Jul. 2, 2019

(54) COMPUTER CLUSTER SYSTEM

(71) Applicant: MITAC COMPUTING TECHNOLOGY CORPORATION, Taoyuan (TW)

(72) Inventor: Ke-Chun Chuang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 79 days.

(21) Appl. No.: 15/671,265

(22) Filed: Aug. 8, 2017

(65) Prior Publication Data

US 2018/0107599 A1 Apr. 19, 2018

(30) Foreign Application Priority Data

Oct. 19, 2016 (TW) .............................. 105133644 A

(51) Int. Cl.
| | |
|---|---|
| *H04L 12/42* | (2006.01) |
| *G06F 12/0813* | (2016.01) |
| *G06F 13/42* | (2006.01) |
| *G06F 12/0888* | (2016.01) |
| *H04L 12/715* | (2013.01) |

(52) U.S. Cl.
CPC .......... *H04L 12/42* (2013.01); *G06F 12/0813* (2013.01); *G06F 13/4243* (2013.01); *G06F 12/0888* (2013.01); *H04L 45/46* (2013.01)

(58) Field of Classification Search
CPC . G06F 12/0813; G06F 13/4243; H04L 45/46; H04L 12/42; H04L 2012/421
See application file for complete search history.

(56) References Cited

U.S. PATENT DOCUMENTS

| | | | | | |
|---|---|---|---|---|---|
| 4,679,191 | A | * | 7/1987 | Nelson ...................... | H04L 5/24 370/355 |
| 5,504,747 | A | * | 4/1996 | Sweazey .................. | H04L 12/66 370/403 |
| 6,658,509 | B1 | * | 12/2003 | Bonella ............... | G06F 13/1684 370/223 |
| 2008/0140892 | A1 | * | 6/2008 | Fong ..................... | H04L 12/423 710/111 |
| 2012/0250695 | A1 | * | 10/2012 | Jia .......................... | H04L 12/42 370/400 |

(Continued)

FOREIGN PATENT DOCUMENTS

| | | |
|---|---|---|
| TW | 201004220 A | 1/2010 |
| TW | I431997 B | 3/2014 |

OTHER PUBLICATIONS

Search Report appended to an Office Action issued to Taiwanese counterpart application No. 105133644 by the TIPO dated Mar. 14, 2018 (2 pages, English translation included).

*Primary Examiner* — Min Jung
(74) *Attorney, Agent, or Firm* — Michael Best & Friedrich LLP

(57) ABSTRACT

A computer cluster system includes a plurality of computer groups each having a plurality of computer nodes. For each of the computer groups, the computer nodes cooperatively form a first ring topology, and one of the computer nodes serves as a first-ring master node of the first ring topology. The first-ring master nodes of the first ring topologies cooperatively form a second ring topology, and one of the first-ring master nodes serves as a second-ring master node of the second ring topology.

8 Claims, 3 Drawing Sheets

(56) References Cited

U.S. PATENT DOCUMENTS

| | | | |
|---|---|---|---|
| 2013/0279525 A1* | 10/2013 | Zheng | H04J 3/0667 370/516 |
| 2014/0075002 A1 | 3/2014 | Pradhan et al. | |
| 2015/0055451 A1* | 2/2015 | Holmberg | H04L 49/557 370/218 |
| 2016/0142225 A1* | 5/2016 | Taniguchi | H04L 12/437 370/223 |

* cited by examiner

COMPUTER CLUSTER SYSTEM

CROSS-REFERENCE TO RELATED APPLICATION

This application claims priority of Taiwanese Patent Application No. 105133644, filed on Oct. 19, 2016.

FIELD

The disclosure relates to a computer cluster system, and more particularly to a computer cluster system of a multi-level ring topology.

BACKGROUND

A computer cluster system includes a plurality of computer nodes that are coupled to each other according to a network topology. Generally, network topologies may be classified into centralized architecture and non-centralized architecture. FIG. 1 shows a conventional star topology, which is a common centralized architecture, and which has a central computer node 8 directly coupled to other computer nodes 9 for managing and monitoring the system. Although the centralized architecture may lead to higher data transmission efficiency, hardware cost is higher due to the additional central computer node 8. FIG. 2 shows a conventional ring topology of which one computer node 9 is selected to be a master node that manages and monitors the entire system, leading to lower hardware cost since an additional central computer node is not required. However, for the ring topology, a maximum length of the data transmission path between two computer nodes 9 is around half of a number of the computer nodes 9, resulting in lower data transmission efficiency. When the number of the computer nodes 9 is large, the master node may spend a lot of time collecting node data such as temperature data of CPU and memory modules of each computer node, and is thus unable to instantly perform, according to the node data of all of the computer nodes, corresponding operations such as adjusting rotation speeds of external fans of the computer cluster system. Therefore, how to enhance the speed of collecting all the node data in one computer cluster system without inducing hardware cost of the additional central computer node is a goal in this field.

SUMMARY

A computer cluster system includes a plurality of computer nodes that are coupled to each other according to a network topology. Generally, network topologies may be classified into centralized architecture and non-centralized architecture. FIG. 1 shows a conventional star topology, which is a common centralized architecture, and which has a central computer node 8 directly coupled to other computer nodes 9 for managing and monitoring the system. Although the centralized architecture may lead to higher data transmission efficiency, hardware cost is higher due to the additional central computer node 8. FIG. 2 shows a conventional ring topology of which one computer node 9 is selected to be a master node that manages and monitors the entire system, leading to lower hardware cost since an additional central computer node is not required. However, for the ring topology, a maximum length of the data transmission path between two computer nodes 9 is around half of a number of the computer nodes 9, resulting in lower data transmission efficiency. When the number of the computer nodes 9 is large, the master node may spend a lot of time collecting node data such as temperature data of CPU and memory modules of each computer node, and is thus unable to instantly perform, according to the node data of all of the computer nodes, corresponding operations such as adjusting rotation speeds of external fans of the computer cluster system. Therefore, how to enhance the speed of collecting all the node data in one computer cluster system without inducing hardware cost of the additional central computer node is a goal in this field.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
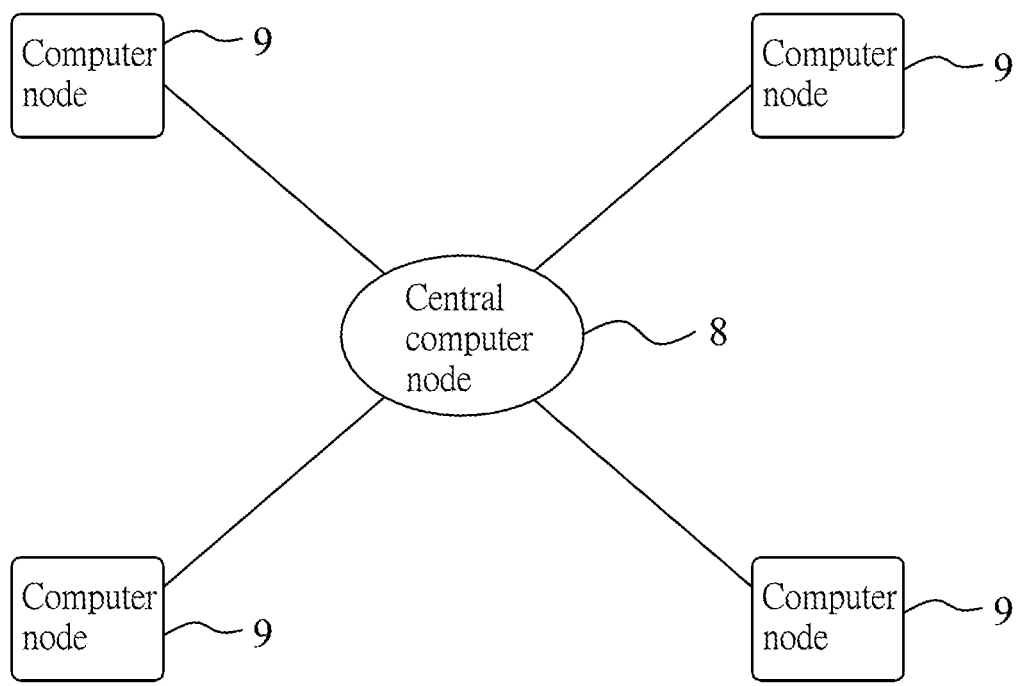
FIG. 1 is a block diagram illustrating a conventional star topology for a computer cluster system.
Figure 2:
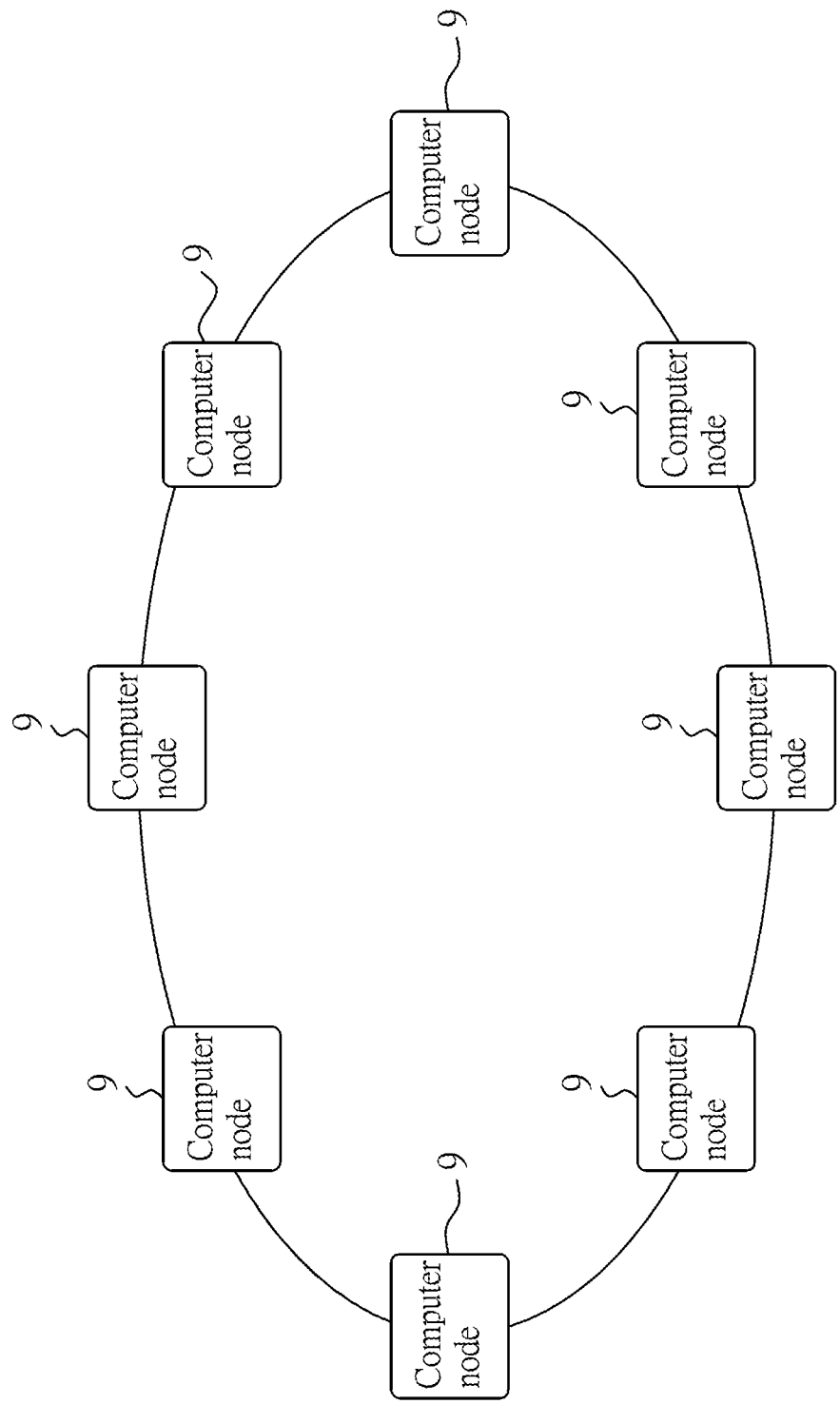
FIG. 2 is a block diagram illustrating a conventional ring topology for a computer cluster system.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
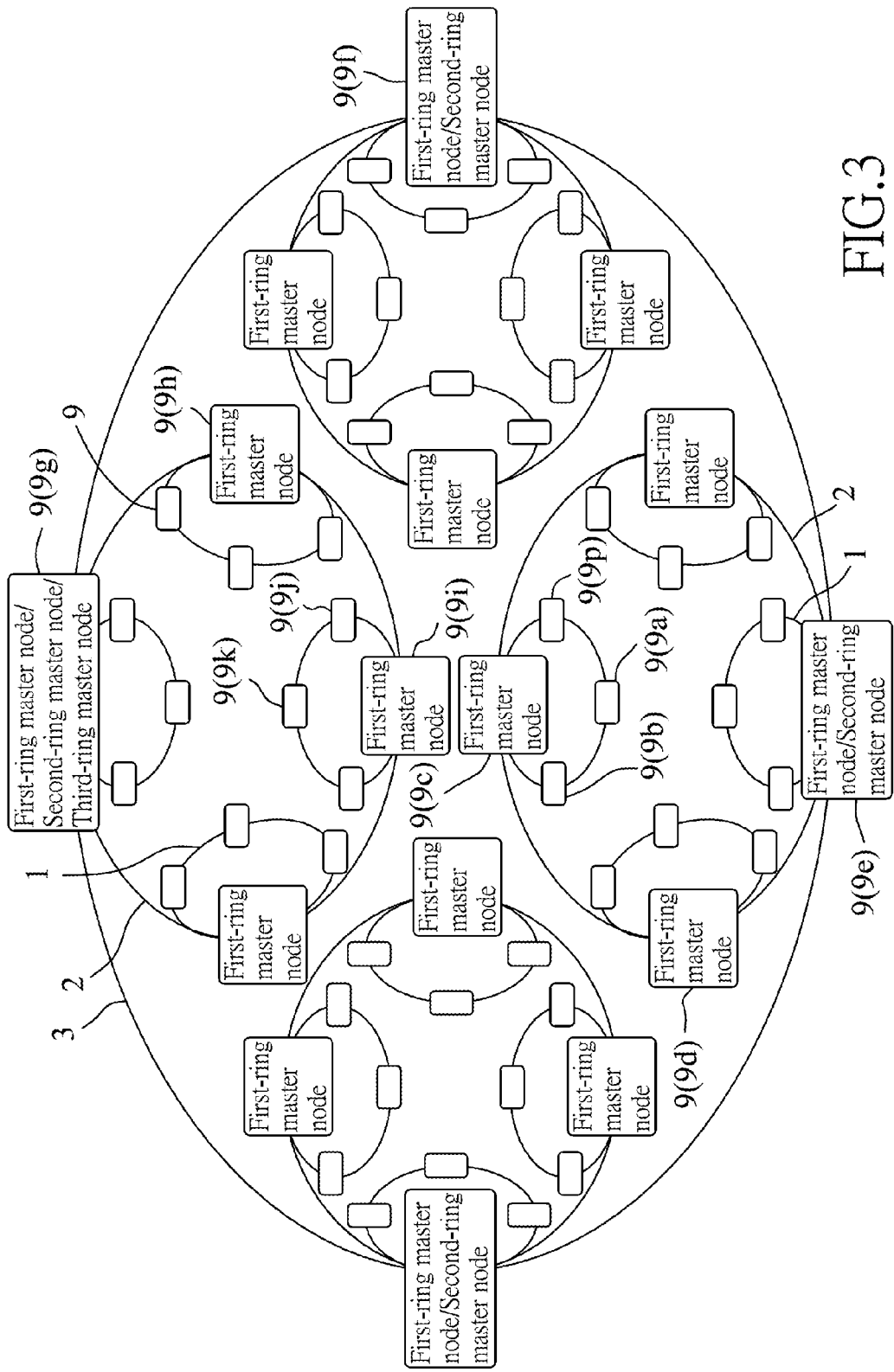
FIG. 3 is a block diagram illustrating an embodiment of a computer cluster system that employs a multi-level ring topology according to the disclosure.

Referring to FIG. 3, the embodiment of a network topology of the computer cluster system according to this disclosure is shown to include sixty-four computer nodes 9 that are divided into sixteen computer groups each having four computer nodes 9. For each computer group, the four computer nodes 9 cooperatively form a first ring topology 1. That is, there are totally sixteen first ring topologies 1 in this embodiment. For each first ring topology 1, one of the computer nodes 9 serves as a master node (first-ring master node) of the corresponding first ring topology 1. The first-ring master node is responsible for managing and monitoring the computer nodes 9 in the corresponding first ring topology 1. The sixteen first ring topologies 1 are divided into four first ring topology groups. For each first ring topology group, the first-ring master nodes of the four first ring topologies 1 cooperatively form a second ring topology 2. That is to say, the first-ring master nodes of the first ring topologies 1 that are grouped into the same first ring topology group cooperatively form a second ring topology 2. In other words, there are four second ring topologies 2 in total. For each second ring topology 2, one of the first-ring master nodes serves as a master node (second-ring master node) of the corresponding second ring topology 2. The second-ring master node is responsible for managing and monitoring the computer nodes 9 in the corresponding second ring topology 2. The second-ring master nodes of the four second ring topologies 2 cooperatively form a third ring topology 3, and one of the second-ring master nodes serves as a master node (third-ring master node) of the third ring topology 3. The third-ring master node is responsible for managing and monitoring the entire computer cluster system.

Accordingly, the network topology of the embodiment may be deemed as a three-level ring topology architecture, where the first level corresponds to the sixteen first ring topologies 1, the second level corresponds to the four second ring topologies 2, and the third level corresponds to the third ring topology 3.

Each computer node 9 includes respective node data containing monitoring information of itself, such as temperature data and/or operating states of components thereof (e.g., CPU, memory modules, etc.), fan speeds, etc.

For each first ring topology 1, each computer node 9 periodically transmits a data request to each of the computer nodes 9 that are directly coupled thereto (i.e., adjacent two of the computer nodes 9); and transmits, upon receipt of the data request transmitted by each of the adjacent two of the computer nodes 9, all of the node data stored therein (including the node data of itself, and perhaps the node data of another one or more computer nodes 9 of the same corresponding first ring topology 1, which was received through the adjacent computer nodes 9 during previous data request/transmission processes) to the computer node 9 from which the data request has now been received. It is noted that throughout this disclosure, when two computer nodes are described as being "adjacent", it means that the two computer nodes are directly connected together, namely, the two computer nodes are adjacent in terms of connection relationship, such description should not be taken as imposing any limitation on the relationship of the computer nodes in terms of their physical locations. As a result, the first-ring master node of each first ring topology 1 may store the node data of all of the computer nodes 9 of the corresponding first ring topology 1.

Similarly, for each second ring topology 2, each first-ring master node periodically transmits a data request to each of the first-ring master nodes that are directly coupled thereto (i.e., adjacent two of the first-ring master nodes); and transmits, upon receipt of the data request transmitted by each of the adjacent two of the first-ring master nodes, all of the node data stored therein (including the node data of all of the computer nodes 9 of the same corresponding first ring topology 1, and perhaps the node data of the computer nodes 9 of another one or more first ring topologies 1 of the same corresponding second ring topology 2, which was received through the adjacent first-ring master nodes during previous data request/transmission processes) to the first-ring master node from which the data request has now been received. As a result, the second-ring master node of each second ring topology 2 may store the node data of each computer node 9 of each first ring topology 1 that is coupled to the corresponding second ring topology 2.

Similarly, for the third ring topology 3, each second-ring master node periodically transmits a data request to each of the second-ring master nodes that are directly coupled thereto (i.e., adjacent two of the second-ring master nodes); and transmits, upon receipt of the data request transmitted by each of the adjacent two of the second-ring master nodes, all of the node data stored therein (including the node data of all of the computer nodes 9 of the same corresponding second ring topology 2, and perhaps the node data of the computer nodes 9 of the first ring topologies 1 that are coupled to another one or more second ring topologies 2, which was received through the adjacent second-ring master nodes during previous data request/transmission processes) to the second-ring master node from which the data request has now been received. As a result, the third-ring master node may store the node data of all of the sixty-four computer nodes 9 of the computer cluster system.

For each first ring topology 1, a first-ring transmission path through which the node data of each computer node 9 may be transmitted to the corresponding first-ring master node has a length that is defined by a number of the computer node(s) 9 through which the node data from the initial computer node 9 to the corresponding first-ring master node travels. That is, the length may be defined by a number of the computer node(s) 9 which receives (receive) the node data during transmission of the node data from the initial computer node 9 to the corresponding first-ring master node, or by a number of the computer node(s) 9 which transmits (transmit) the node data during transmission of the node data from the initial computer node 9 to the corresponding first-ring master node (the numbers acquired by the two definitions would be the same). The node data includes data associated with the length of the data transmission path through which the node data has traveled. When a computer node 9 receives a piece of node data from an adjacent computer node 9, the computer node 9 updates the data by adding one to the length of the data transmission path. When the first-ring master node receives, respectively from the adjacent two computer nodes 9, two pieces of the node data of one and the same computer node 9, the first-ring master node determines, according to each piece of the node data that includes data associated with the length of the corresponding first-ring transmission path, one of the two pieces of the node data, of which the first-ring transmission path is shorter, to be a relatively new node data piece, and determines the other piece of the node data to be a relatively old node data piece. Then, the first-ring master node discards the relatively old node data piece. As exemplified in FIG. 3, the node data of the computer node 9b may be directly transmitted to the first-ring master node 9c, wherein the length of the corresponding first-ring transmission path is one node, or through a path of the computer node 9a, the computer node 9p and the first-ring master node 9c in sequence, wherein the length of the corresponding first-ring transmission path is three nodes. If the first-ring master node 9c simultaneously receives two pieces of the node data of the computer node 9b, the first-ring master node 9c is configured to determine that the node data received through the path with the length of one node to be the relatively new node data piece for the computer node 9b, and discards the node data of the computer node 9b that is received through the path with the length of three nodes.

Similarly, a second-ring transmission path through which the node data of each computer node 9 may be transmitted to the corresponding second-ring master node has a length that is defined by a number of the first-ring master node(s) through which the node data from the first-ring master node of the corresponding first ring topology 1 to the corresponding second-ring master node travels (i.e., a number of the first-ring master node(s) which receives (receive) the node data during transmission of the node data from the corresponding first-ring master node to the corresponding second-ring master node, or a number of the first-ring master node(s) which transmits (transmit) the node data during transmission of the node data from the corresponding first-ring master node to the corresponding second-ring master node). A length of each possible path (excluding the path taken by any discarded node data) from one computer node 9 to the corresponding second-ring master node is the sum of a corresponding first-ring transmission path and a corresponding second-ring transmission path, and is referred to as a total second-ring transmission path herein. As a result, a length of the total second-ring transmission path is a sum of the lengths of the corresponding first-ring and second-ring transmission paths. For each second ring topology 2, when the second-ring master node receives, respectively from the adjacent two first-ring master nodes, two pieces of the node data of one and the same computer node 9, the second-ring master node determines, according to each piece of the node data that includes data associated with the length of the corresponding total second-ring transmission path, one of the two pieces of the node data, of which the total second-ring transmission path is shorter, to be a relatively new node data piece, and determines the other piece of the node data to be a relatively old node data piece. Then, the second-ring master node discards the relatively old node data piece.

Similarly, a third-ring transmission path through which the node data of each computer node 9 may be transmitted to the third-ring master node has a length that is defined by a number of the second-ring master nodes through which the node data from the second-ring master node of the corresponding second ring topology 2 to the third-ring master node travels (i.e., a number of the second-ring master node(s) which receives (receive) the node data during transmission of the node data from the corresponding second-ring master node to the third-ring master node, or a number of the second-ring master node(s) which transmits (transmit) the node data during transmission of the node data from the corresponding second-ring master node to the third-ring master node). A length of each possible path (excluding the path taken by any discarded node data) from one computer node 9 to the third-ring master node is the sum of a corresponding total second-ring transmission path and a corresponding third-ring transmission path, and is referred to as a total third-ring transmission path herein. As a result, a length of the total third-ring transmission path is a sum of the lengths of the corresponding total second-ring transmission path and the corresponding third-ring transmission path. In this embodiment, when the third-ring master node receives, respectively from the adjacent two second-ring master nodes, two pieces of the node data of one and the same computer node 9, the third-ring master node determines, according to each piece of the node data that includes data associated with the length of the corresponding total third-ring transmission path, one of the two pieces of the node data, of which the total third-ring transmission path is shorter, to be a relatively new node data piece, and determines the other piece of the node data to be a relatively old node data piece. Then, the third-ring master node discards the relatively old node data piece.

In another or the same embodiment, the node data of each computer node 9 may include a timestamp. In such implementation, when the third-ring master node receives, respectively from the adjacent two second-ring master nodes, two pieces of the node data of one and the same computer node 9, the third-ring master node may determine the relatively new node data piece and the relatively old node data piece according to the timestamp of each of the two pieces of the node data.

Compared to the conventional ring topology, the multi-level ring topology architecture of this disclosure has a relatively short maximum length of a transmission path between two of the computer nodes 9. For example, for the conventional ring topology that is formed by sixty-four computer nodes, the maximum length of the transmission path between two computer nodes is thirty-two nodes. On the other hand, the maximum length of the transmission path between two computer nodes 9 in the embodiment is ten nodes, e.g., a path between the computer nodes 9*a* and 9*k* through the computer nodes 9*b*, 9*c*, 9*d*, 9*e*, 9*f*, 9*g*, 9*h*, 9*i*, 9*j*, 9*k* in sequence. Furthermore, the maximum length of the transmission path between one computer node 9 and the third-ring master node taken by any non-discarded node data (i.e., the total third-ring transmission path), which manages and monitors the entire computer cluster system in the embodiment, is six nodes, e.g., a path between the computer nodes 9*a* and 9*g* through the computer nodes 9*b*, 9*c*, 9*d*, 9*e*, 9*f*, 9*g* in sequence.

Although the embodiment exemplifies the multi-level ring topology architecture of this disclosure using the three-level ring topology architecture, persons with ordinary skill in the art would understand that the rules described above may also apply to two-level, four-level or higher-level ring topology architecture, and the disclosure is not limited thereto. According to this disclosure, if a total number of the computer nodes in the computer cluster system is NK, where N is a number of the computer nodes that form a single ring topology, and K is a number of the levels, a maximum length of a transmission path between two computer nodes is $N \div 2 + N \times (K-1)$ nodes when N is an even number, and is $(N-1) \div 2 + (N-1) \times (K-1)$ when N is an odd number; and a maximum length of a total transmission path between one computer node and a master node (the highest-level master node) that manages and monitors the entire computer cluster system is $N \div 2 \times K$ nodes when N is an even number, and is $(N-1) \div 2 \times K$ when N is an odd number.

The multi-level ring topology architecture of this disclosure may apply to a rack server cluster system of which each computer node includes a baseboard management controller (BMC) for monitoring operations of the computer node, such as temperature data of elements thereof, such as CPU, memory module, etc. The rack server cluster system may be configured with a plurality of external fans that require node data including for example, the temperature data of the CPU and the memory modules, for controlling a rotational speed of each fan. In this disclosure, since the maximum length of the total transmission path (e.g., the total third-ring transmission path in the embodiment) between one computer node and the master node (e.g., the third-ring master node in this embodiment) that monitors the entire computer cluster system is relatively small compared to that in the conventional ring topology architecture, time required for collecting the node data (e.g., the temperature data) of all computer nodes by the master node is relatively short, resulting in higher data collection efficiency, and the master node can thus instantly perform appropriate operation such as controlling rotational speeds of the external fans according to the node data of all the computer nodes.

In summary, the computer cluster system of this disclosure employs the multi-level ring topology architecture to connect all of the computer nodes without requiring an additional computer node to manage the entire system, and whilst having the advantage of the conventional ring topology architecture, achieves higher data transmission efficiency to satisfy instantaneous data transmission requirement in comparison to the conventional ring topology architecture.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A computer cluster system, comprising a plurality of computer groups each having a plurality of computer nodes;
wherein, for each of said computer groups, said computer nodes cooperatively form a first ring topology, and, for each of said computer groups, one of said computer nodes serves as a first-ring master node of said first ring topology; and
wherein said first-ring master nodes of said first ring topologies cooperatively form a second ring topology, and one of said first-ring master nodes serves as a second-ring master node of said second ring topology;
wherein, for each of said first ring topologies, each of said computer nodes has respective node data, and said first-ring master node receives the node data of each of the other ones of said computer nodes of said first ring topology through two of said computer nodes that are directly coupled to said first-ring master node; and
wherein said second-ring master node receives, through two of said first-ring master nodes that are directly coupled to said second-ring master node, the node data of each of said computer nodes of each of said first ring topologies other than one of said first ring topologies that has said second-ring master node.

2. The computer cluster system of claim 1, wherein, for each of said first ring topologies, each of said computer nodes periodically transmits a data request to each of said computer nodes that are directly coupled to said each of said computer nodes;
wherein, for each of said first ring topologies, each of said computer nodes transmits, upon receipt of the data request transmitted by one of said computer nodes that is directly coupled to said each of said computer nodes, all of the node data stored therein to said computer node from which the data request is received;
wherein, for said second ring topology, each of said first-ring master nodes periodically transmits a data request to each of adjacent two of said first-ring master nodes that are directly coupled to said each of said first-ring master nodes; and
wherein, for said second ring topology, each of said first-ring master nodes transmits, upon receipt of the data request transmitted by one of said first-ring master nodes that is directly coupled to each of said first-ring master nodes, all of the node data stored therein to said first-ring master node from which the data request is received.

3. The computer cluster system of claim 1, wherein, for each of said computer nodes, a total transmission path taken for transmission of the node data from said computer node to the second-ring master node has a length that is defined by a sum of a length of a first-ring transmission path through which the node data is transmitted from said computer node to said first-ring master node of the corresponding one of said first ring topologies, and a length of a second-ring transmission path through which the node data is transmitted from said first-ring master node of the corresponding one of said first ring topologies to said second-ring master node; and
wherein, when said second-ring master node receives, respectively from two of said first-ring master nodes that are directly coupled to said second-ring master node, two pieces of the node data of a same one of said computer nodes, said second-ring master node determines one of said two pieces of the node data, of which the total transmission path is shorter, to be a relatively new node data piece, determines the other one of said two pieces of the node data to be a relatively old node data piece.

4. The computer cluster system of claim 3, wherein, when the node data is received by said second-ring master node, data associated with the length of the corresponding total transmission path, which is a number of said computer node(s) through which the node data transmitted from said computer node to said second-ring master node travels, is also received by said second-ring master node.

5. The computer cluster system of claim 3, wherein, after said second-ring master node determines the relatively new node data piece and the relatively ole node data piece, said second-ring master node discards the relatively old node data piece.

6. The computer cluster system of claim 1, wherein for each of said computer nodes, the node data includes a timestamp; and
wherein, when said second-ring master node receives, respectively from two of said first-ring master nodes that are directly coupled to said second-ring master node, two pieces of the node data of a same one of said computer nodes, said second-ring master node determines one of said two pieces of the node data to be a relatively new node data piece, and the other one of said two pieces of the node data to be a relatively old node data piece according to the timestamp of each of said two pieces of the node data.

7. The computer cluster system of claim 6, wherein, after said second-ring master node determines the relatively new node data piece and the relatively ole node data piece, said second-ring master node discards the relatively old node data piece.

8. The computer cluster system of claim 1, wherein for each of said computer nodes, the node data contains monitoring information associated with said computer node.

* * * * *